T. J. SMITH.
Seed Planter.

Patented Jan. 25, 1870.

Witnesses:

Inventor:

T. J. SMITH.
Seed Planter.
No. 99,118.
2 Sheets—Sheet 2.
Patented Jan. 25, 1870.
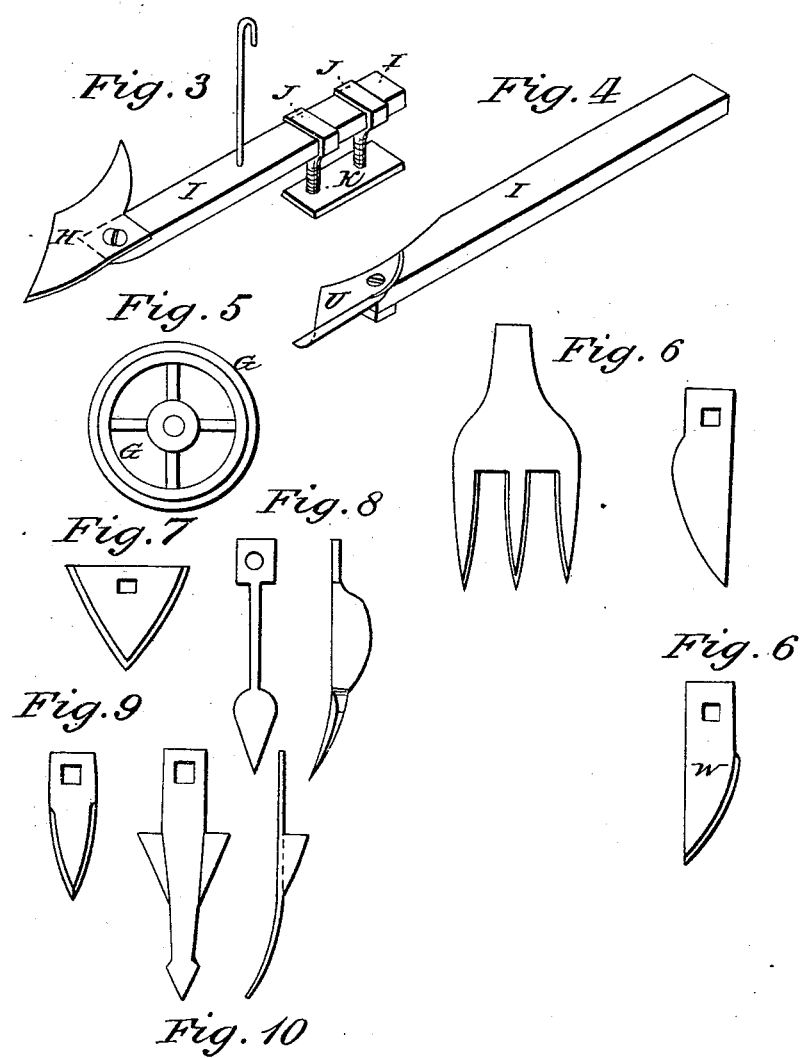

United States Patent Office.

THOMAS J. SMITH, OF HOLLY SPRINGS, MISSISSIPPI.

Letters Patent No. 99,118, dated January 25, 1870.

IMPROVED COMBINED PLOW, PLANTER, AND CULTIVATOR.

The Schedule referred to in these Letters Patent and making part of the same.

*To all whom it may concern:*

Be it known that I, THOMAS J. SMITH, of Holly Springs, in the county of Marshall, and State of Mississippi, have invented a new and useful Improvement in Combined Plow, Planter, and Cultivator; and I do hereby declare that the following is a full, clear, and exact description thereof, which will enable others skilled in the art to make and use the same, reference being had to the accompanying drawings, forming part of this specification, in which—

Figures 3 to 13, inclusive, are detail views of parts of the machine.

Similar letters of reference indicate corresponding parts.

My invention has for its object to furnish a simple and convenient machine for preparing the ground, planting corn, peas, cotton, &c., and cultivating the plants; and It consists in the construction and combination of the different parts of the machine, as hereinafter more fully described.

A are the side-bars of the frame, which are connected to each other by the cross-bars B C D.

Figure 1:
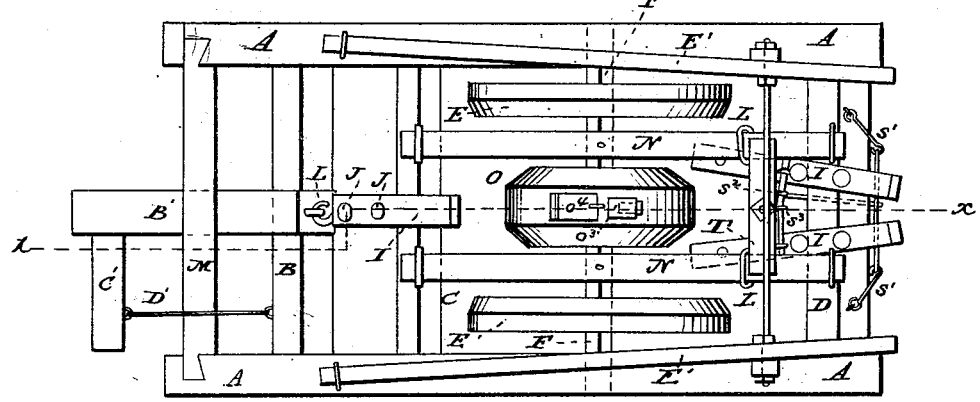
Figure 1 is a top or plan view of my improved machine.
Figure 2:
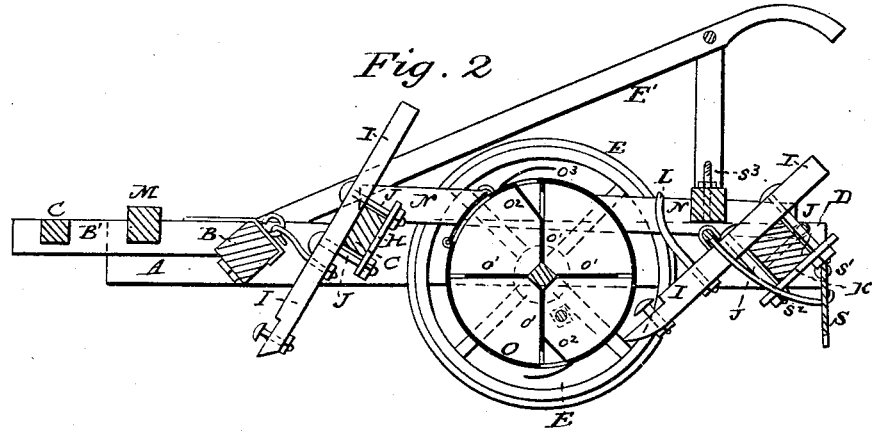
Figure 2 is a vertical longitudinal section of the same, taken through the line $x\ x$, fig. 1.

The cross-bars B C D are placed cornerwise, as shown in figs. 1 and 2, so that the plow-standards may rest squarely against them, as shown in fig. 2.

E are the planting-wheels, which are detachably secured to the axle F, in such a way as to carry the said axle F with them in their revolution.

The journals of the axle F revolve in bearings attached to the side-bars A of the frame.

When the machine is to be used for plowing or cultivating, the large wheels E are detached from the axle F, and a pair of smaller wheels, G, secured to said axle, so as to support the frame at a lower level.

H are turn-shovel plows, placed upon the cross-bars B and C, and arranged to throw the soil in the same direction for beading or ridging land for corn, cotton, or other crops planted in that way.

The plows H may be used for breaking up land by placing one of said plows upon the beam or bar A, and another upon the bar C; or, a right-hand turn-plow, H, and a left-hand turn-plow, H, may be placed upon the bar A, for cultivating, by throwing dirt upon both sides of the plants being cultivated.

I are the standards, to which the various plows are attached, and which are adjustably secured to the beams or bars B C D, by bolts J and straps or yokes K.

The bolts J may pass through holes in the standards I, as shown in figs. 1 and 2, or they may have eyes formed in them to receive said standards, as shown in fig. 3.

The bolts J are arranged, the one above and the other below the beam to which the standard is to be attached, and their lower ends pass through the strap or yoke K, placed upon the lower side of said bar or beam, thus clamping the standard adjustably to the upper inclined side of said bar or beam, as shown in figs. 1 and 2.

The draught-strain upon the standards I is supported by the bars or rods L, the lower ends of which are secured to the lower parts of said standards I, and the upper ends of which have hooks or eyes formed upon them, to hook upon the cross-beam M, hooks or eyes attached to the bar or beam A, or upon the longitudinal bars N, according as the said standards are attached to one or the other of the cross-bars or beams B C D.

O is the seed-box for planting corn, peas, and similar seeds. The box O is made cylindrical in its general form, and is detachably secured to the axle F, so as to be carried around by and with said axle in its revolution.

The box O is divided into compartments by radial partitions or buckets $o^1$, having small holes in their outer ends, to allow the seed to pass from one compartment to another.

At the outer ends of one or more of the partitions $o^1$, are formed small compartments, by means of the inclined partitions $o^2$, according to the distance apart at which the seed is required to be dropped.

In the bottom of the small compartments are formed the discharge-orifices, through which the seed escapes to the ground.

The discharge-orifices are partially closed by valves $o^3$, so that the amount of seed escaping may be regulated by adjusting the valves $o^3$, which may be done by set-screws or other convenient means.

The seed is introduced into the box O, through small doors $o^4$, secured in place by hinges and latches or other convenient fastenings.

In planting, the furrow is opened to receive the seed by a plow attached to the middle part of the cross-bar or beam C, and the seed is covered by two plows attached to the rear cross-bar or beam D, as indicated by the positions of the plow-standards in fig. 1.

The ridge or row is smoothed off, in the rear of the covering-plows, by the plate S, the lower edge of which is concaved, to leave the ground properly rounded up.

The plate S is suspended from the rear cross-bar or beam D, by the rods $s^1$, and it is held at the proper angle, and supported against the draught-strain, by the rod $s^2$, connected with the adjustable eye-bolt $s^3$, which passes up through the short bar T, and has a screw-nut placed upon its upper end.

I have shown, in fig. 4, a scraper, attached to one of the standards I, and in figs. 6, 7, 8, 9, and 10, the forms of plows or implements I employ in connection with the plows H and U, in adapting my invention to perform the various functions of a cotton-scraper, planter, cultivator, &c. These are shown as provided with square holes in their shanks, to permit them to be securely attached to the standards I, by means of bolts having corresponding shape in cross-section.

B' is the tongue or draught-bar of the machine, which is securely attached to the forward part of the frame A B C D, and which is provided with a short cross-bar, C', so that the draught may be attached to the tongue B' or cross-bar C', as may be desired.

The draught-strain upon the cross-bar C' may be supported by a stay-rod or chain, D', connecting the free end of the said cross-bar C' with the frame A B C D.

E' are the handles, which are securely attached to the side-bars A, and which are connected by a round, in the ordinary manner.

Having thus described my invention,
I claim as new, and desire to secure by Letters Patent—

1. The cross-bars B C D, secured rigidly and arranged cornerwise, to form the bearing for the standards I, as shown and described.

2. The improved machine, consisting of the frame A B C D, wheels E, standards I, axle F, seed-box O, cross-bars C, and draught-bars B' and C', all constructed and arranged as set forth and shown.

3. The seed-box O, $o^1$ $o^2$ $o^3$ $o^4$, constructed substantially as herein shown and described, in combination with the axle F, wheels E, and frame A B C D, as and for the purpose set forth.

T. J. SMITH.

Witnesses:
CHARLES DRAKE,
J. W. WILLIAMS.